United States Patent
Covic et al.

(10) Patent No.: US 11,376,966 B2
(45) Date of Patent: Jul. 5, 2022

(54) ELECTRIC VEHICLE DETECTION FOR ROADWAY WIRELESS POWER TRANSFER

(71) Applicant: Auckland UniServices Limited, Auckland (NZ)

(72) Inventors: Grant Anthony Covic, Mount Albert (NZ); Abhilash Kamineni, Mt. Roskill (NZ); Michael John Neath, Birkenhead (NZ)

(73) Assignee: Auckland UniServices Limited, Auckland (NZ)

( * ) Notice: Subject to any disclaimer, the term of this patent is extended or adjusted under 35 U.S.C. 154(b) by 219 days.

(21) Appl. No.: 16/318,980

(22) PCT Filed: Jul. 21, 2017

(86) PCT No.: PCT/NZ2017/050100
§ 371 (c)(1),
(2) Date: Jan. 18, 2019

(87) PCT Pub. No.: WO2018/016976
PCT Pub. Date: Jan. 25, 2018

(65) Prior Publication Data
US 2019/0217726 A1    Jul. 18, 2019

(30) Foreign Application Priority Data
Jul. 21, 2016 (NZ) ........................................ 722264

(51) Int. Cl.
*B60L 5/00* (2006.01)
*H01F 38/14* (2006.01)
(Continued)

(52) U.S. Cl.
CPC ............. *B60L 5/005* (2013.01); *B60L 53/126* (2019.02); *B60M 7/00* (2013.01); *H01F 38/14* (2013.01);
(Continued)

(58) Field of Classification Search
CPC ......................................................... H02J 7/025
(Continued)

(56) References Cited

U.S. PATENT DOCUMENTS 8,587,154 B2* 11/2013 Fells .................... H04B 5/0081
307/104
2012/0255946 A1* 10/2012 Kim ....................... H05B 6/065
219/622

(Continued)

FOREIGN PATENT DOCUMENTS

WO   WO-2010090539 A1   8/2010
WO   WO-2011016731 A1   2/2011
(Continued)

OTHER PUBLICATIONS

"International Application No. PCT/NZ2017/050100, International Preliminary Report on Patentability dated Jan. 31, 2019", (Jan. 31, 2019), 12 pgs.

(Continued)

*Primary Examiner* — Drew A Dunn
*Assistant Examiner* — Ahmed H Omar
(74) *Attorney, Agent, or Firm* — Piloff Passino & Cosenza LLP; Martin J. Cosenza

(57) ABSTRACT

A method of detecting a wirelessly powered vehicle on a roadway uses detection of induced voltages or currents in coils provided in the roadway. Once the vehicle has been detected the appropriate coils can be energised to power the vehicle.

25 Claims, 13 Drawing Sheets

(51) Int. Cl.
*H02J 50/40* (2016.01)
*H02J 50/12* (2016.01)
*H02J 50/10* (2016.01)
*H02J 50/00* (2016.01)
*B60M 7/00* (2006.01)
*B60L 53/126* (2019.01)
*H02J 7/02* (2016.01)

(52) U.S. Cl.
CPC ............ *H02J 7/025* (2013.01); *H02J 50/00* (2016.02); *H02J 50/10* (2016.02); *H02J 50/12* (2016.02); *H02J 50/40* (2016.02); *B60Y 2200/91* (2013.01); *B60Y 2300/91* (2013.01); *Y02T 10/70* (2013.01); *Y02T 10/7072* (2013.01); *Y02T 90/12* (2013.01); *Y02T 90/14* (2013.01)

(58) Field of Classification Search
USPC .......................................... 320/104, 108, 109
See application file for complete search history.

(56) References Cited

U.S. PATENT DOCUMENTS

| 2014/0183966 | A1 | 7/2014 | Suzuki et al. | |
| 2015/0246614 | A1* | 9/2015 | Dames et al. | B60L 5/005 320/104 |
| 2016/0016478 | A1 | 1/2016 | Saito et al. | |
| 2016/0037584 | A1* | 2/2016 | Viroli | H05B 6/1272 324/207.17 |
| 2016/0190814 | A1* | 6/2016 | Budhia | H01F 38/14 307/104 |
| 2017/0368944 | A1* | 12/2017 | Huang | H02J 7/025 |

FOREIGN PATENT DOCUMENTS

| WO | WO-2011016736 A2 | 2/2011 |
| WO | WO-2012018269 | 2/2012 |
| WO | WO-2014073990 | 5/2014 |
| WO | WO-2018016976 A1 | 1/2018 |

OTHER PUBLICATIONS

Kamineni, Abhilash, et al., "Interoperable EV Detection for Dynamic Wireless Charging With Existing Hardware and Free Resonance", IEEE Transactions on Transportation Electrification (vol. 3, Issue 2, Jun. 2017 ); IEEE PELS Workshop on Emerging Technologies: Wireless Power Transfer; Oct. 4-6, 2016, Knoxville, TN, (Nov. 22, 2016), 370-379.

Khalilian, Mojtaba, et al., "Load identification in dynamic wireless power transfer system utilizing current injection in the transmitting coil", 2016 IEEE Wireless Power Transfer Conference (WPTC), Aveiro, 2016, pp. 1-4. doi: 10.1109/WPT.2016.7498793, (May 5, 2016), 1-4.

"International Application No. PCT/NZ2017/050100. International Search Report and Written Opinion dated Nov. 7, 2017", (Nov. 7, 2017), 17 pgs.

* cited by examiner

ELECTRIC VEHICLE DETECTION FOR ROADWAY WIRELESS POWER TRANSFER

PRIORITY CLAIM TO RELATED APPLICATIONS

This application is a U.S. national stage filing under 35 U.S.C. § 371 from International Application No. PCT/NZ2017/050100, filed on 21 Jul. 2017, and published as WO2018/016976 on 25 Jan. 2018, which claims the benefit under 35 U.S.C. 119 to New Zealand Application No. 722264, filed on 19 Jul. 2016, the benefit of priority of each of which is claimed herein, and which applications and publication are hereby incorporated herein by reference in their entirety.

FIELD OF THE INVENTION

This invention relates to powering or charging electric vehicles (EVs) wirelessly using inductive power transfer (IPT), and has particular relevance to detection of an EV on a roadways so that appropriate regions or sections of a roadway can be energised at the appropriate time to make power available to the vehicle.

BACKGROUND

Inductive Power Transfer (IPT) is a technology which allows power to be transferred wirelessly over a large air gap. This technology has been proposed for use to charge EVs on roadways and is currently being standardised for stationary charging applications for vehicles on roadway surfaces such as in garages and car parks. This highly resonant IPT can also be used in applications requiring dynamic power transfer where for example a vehicle is able to be powered and/or charged as it moves over an electrified path, road or highway. This can enable an EV to potentially travel an unlimited distance over these electrified roadways without needing to stop for a charge. Combined with recent developments in self driving technology, there is a potential to revolutionise both consumer and private transportation options. However, most IPT research for EV charging is currently focused on stationary charging and there are still several important issues to solve for dynamic power transfer to be practical.

Dynamic powering is most commonly proposed to be implemented over long sections of road for EVs by ensuring that while driving on the section the vehicle experiences either a continuous or pulsed wave of magnetic field. This is currently achieved by either: a) using an arrangement which energises sections of road that are much larger than the length of a typical vehicle, or; b) using individual modules in the roadway, the modules being similar to, or smaller, in scale to the length of a vehicle, and energising these sequentially as a vehicle moves over them.

There are currently several track based solutions which generate a continuous magnetic field over a section of roadway that is much longer than the length of the vehicle. The difficulty with this type of solution is that the inverters required to drive these tracks have a very high VA rating, meaning that this option is expensive to implement.

While implementing dynamic charging using several individually energised pads in the road requires significantly more inverters, these inverters can be rated to a lower VA and these individual systems have the potential to be more efficient since unused sections of the road are not energised. One method of implementing the individually energised pads is to use a double coupled system proposed in International Patent Publication WO2011016736. This method utilises a long track operated at a low frequency (10-20 kHz) to distribute power to several independent but synchronised 85 kHz inverters which sequentially energise pads, as shown in FIG. 1. Referring to that Figure, a roadway wireless vehicle charging system is shown diagrammatically. Reference throughout this document to the term "pad" or "pads" refers to magnetic structures which are used for coupling magnetic fields to each other for the purposes of power transfer. In practice, the structures usually include at least one coil of electrically conductive material, and frequently (although not necessarily) a magnetically permeable material. These structures may be provided in modular form, with each module containing one or more coils, as described in international patent publication WO2011016736. The structures which are provided as modules located on or in the roadway are referred to in this document as wireless charging modules, or primary pads, or ground pads. The magnetic structure provided on the electric vehicle which is receiving power for the purposes of its operation and/or to charge a battery provided in the vehicle is referred to as vehicle magnetic coupling apparatus, or vehicle pad, or secondary pad. It will be understood by the reader that, while this document refers to roadway systems which operate to charge the vehicle, this includes situations in which power is being supplied to the vehicle but the vehicle is not actually being charged. Also, while this documents refers to roadways, the subject matter disclosed is also applicable to other wireless vehicle systems, such as AGVs for use in industrial or manufacturing environments for example.

In FIG. 1 the box 2 represents apparatus which is provided as part of the infrastructure relating to the roadway. This apparatus can be provided in or on the roadway, or adjacent to the roadway. The ground pads 4 must be provided in or on the roadway in a location in which a vehicle pad 6 passes over them when the vehicle is moving over the roadway. The direction of movement of the typical vehicle pad is illustrated by arrow 8. Therefore, the vehicle pad moves sequentially over a series of ground pads 4. Each ground pad 4 is inductively coupled to a track-way 10 which comprises a loop of conductive material that is driven by an appropriate power supply which may for example include H bridge 12 that is supplied with power from a utility supply 14. Appropriate power factor control 16 and rectification 18 are provided as required.

A considerable challenge to overcome with having individually energised ground pads is to provide a reliable and robust system for detecting when to turn on each ground pad. In a highway scenario the vehicle may be moving at very high speeds of up to 100 km/h (62 mph or 27.7 m/s). Assuming that each ground pad is able to power a vehicle over one meter, this means that each ground pad will only be on for approximately 36 ms for every vehicle. To attempt to establish reliable radio communications with each pad within this time is impractical.

Existing solutions for detecting the location of a secondary pad often rely on extra hardware such as additional detection coils, such as the system disclosed in International Patent Publication WO2014073990. However these methods require additional hardware and apart from cost, ensuring robustness of the in-ground system means ideally minimising this.

Another difficulty is that the magnetic topologies for the primary and secondary pad may be unknown since EV manufacturers may decide to use various magnetic topologies in the vehicle which the primary pad needs to be able to tolerate. Thus any viable detection system must be sufficiently robust to accommodate situations in which the magnetic topology of the vehicle may be unknown, or when the full system is simply not known.

Object

It is an object of the invention to provide an apparatus, system or method which overcomes one or more of the disadvantages of the prior art, or which at least provides a useful alternative.

SUMMARY

In one aspect there is provided a method for supplying power to a vehicle on a roadway comprising a plurality of wireless power transfer coils, the method comprising:

detecting a current or voltage induced in a de-energised wireless power transfer coil, and energising the wireless power transfer coil dependent on a property of the induced current or voltage to make power available to the vehicle.

The method may further comprise the step of opening or closing a switch to make the de-energised coil resonant at a required frequency such that the induced current or voltage is resonant.

Detection of the induced current or voltage may further comprise operating the switch at intervals to allow sampling of the induced current or voltage. In one example a de-energised tuned coil is switched to one state to allow the induced current or voltage to resonate, and switched to another state to allow the induced current or voltage to be non-resonant.

In one example the power transfer coils may be provided in modules located in or on the roadway, and one or more coils may be provided in each module.

The property of the induced current or voltage may comprise magnitude or change in magnitude of the induced current or voltage.

The switch may comprise a plurality of switches which may be used to energise one or more power transfer coils from a power supply. In one example the plurality of switches comprise a push-pull converter. In another example the plurality of switches comprise an H-Bridge.

In another aspect there is provided a wireless power transfer system for wirelessly powering a vehicle on a roadway comprising a plurality of wireless power transfer coils, the system comprising:

a switch associated with each coil to selectively energise the coil to make power available to the vehicle, or de-energise the coil;

a current detector associated with each coil for detecting a current induced in the coil when the coil is de-energised;

a controller to control the switch to energise the coil dependent on an output of the current detector.

In one example the switch may also be controlled to make the de-energised coil resonant at a required frequency such that the induced current is resonant.

Detection of the induced current or voltage may further comprise operating the switch at intervals to allow sampling of the induced current or voltage. In one example a de-energised tuned coil is switched to one state to allow the induced current to resonate, and switched to another state to allow the induced current to be non-resonant.

In one example the power transfer coils may be provided in modules located in or on the roadway, and one or more coils may be provided in each module.

The property of the induced current or voltage may comprise magnitude or change in magnitude of the induced current.

The switch may comprise a plurality of switches which may be used to energise one or more power transfer coils from a power supply. In one example the plurality of switches comprise a push-pull converter. In another example the plurality of switches comprise an H-Bridge.

In another aspect there is provided a vehicle detection circuit for detecting a vehicle on a roadway comprising a plurality of wireless charging modules, the circuit being operable to detect a change in coupling between a second wireless charging module and a first wireless charging module due to the presence of the vehicle.

Preferably the change in coupling comprises a change in coupling between the wireless charging modules due to a wireless power receiver of the vehicle. In one embodiment a permeable magnetic material of the wireless power receiver facilitates coupling between the charging modules.

Preferably the change in coupling occurs when the wireless power receiver of the vehicle is located between or spans the charging modules.

Preferably the change in coupling is detected by detecting an induced resonant signal. In one embodiment the signal is a resonant current.

Preferably the resonant signal is induced in the second wireless charging module from a first wireless charging module via the wireless power receiver of the vehicle.

In another aspect there is provided a vehicle detection circuit for detecting a vehicle having a wireless power receiver on a roadway comprising a plurality of wireless charging modules, the circuit being operable to detect a resonance induced in a second wireless charging module from a first wireless charging module via the wireless power receiver of the vehicle.

In another aspect there is provided vehicle detection apparatus for detecting a vehicle having a wireless power receiver on a roadway comprising a plurality of wireless charging modules, the apparatus comprising the vehicle detection circuit of the preceding statement.

Preferably the detection circuit detects a resonant current.

In another aspect there is provided a roadway system comprising a vehicle detection circuit or vehicle detection apparatus according to one of the preceding statements.

In another aspect there is provided a method of vehicle detection comprising the steps of detecting a change in coupling between a second wireless charging module and a first wireless charging module due to the presence of a vehicle.

Preferably the method includes allowing the second wireless charging module to resonate. The resonant current or voltage may be detected.

In another aspect there is provided a method of detecting an electric vehicle comprising the steps of:

energising a first wireless power transfer coil to make power available to the vehicle;

detecting an induced resonance, or a change in an induced resonance, in a second de-energised wireless power transfer coil located adjacent to the first coil in the direction of travel of the vehicle.

The method may include energising the second coil dependent on a property of the induced current or voltage to make power available to the vehicle.

Preferably the induced resonance is coupled into the second coil from the first coil by a magnetic coupling structure of the vehicle.

The method may further comprise the step of opening or closing a switch to make the de-energised coil resonant at a required frequency.

Detection of the induced current or voltage may further comprise operating the switch at intervals to allow sampling of the induced current or voltage. In one example a de-energised tuned coil is switched to one state to allow the induced current or voltage to resonate, and switched to another state to allow the induced current or voltage to be non-resonant.

In one example the power transfer coils may be provided in modules located in or on the roadway, and one or more coils may be provided in each module.

The property of the induced resonance may comprise magnitude or change in magnitude of the induced resonant current or resonant voltage.

The switch may comprise a plurality of switches which may be used to energise one or more power transfer coils from a power supply. In one example the plurality of switches comprise a push-pull converter. In another example the plurality of switches comprise an H-Bridge.

In another aspect there is provided a vehicle detection circuit for detecting a vehicle on a roadway comprising a plurality of wireless charging coils, the circuit being operable to detect a magnetic coupling between a magnetic coupling apparatus associated with the vehicle and at least one of the wireless charging coils.

Preferably detection of the magnetic coupling comprises detection of a current or voltage in at least one charging coil from a magnetic field produced by the magnetic coupling apparatus associated with the vehicle.

In another aspect there is provided a method for detecting a vehicle on a roadway comprising a plurality of wireless charging coils, the method comprising detecting a magnetic coupling between a vehicle magnetic coupling apparatus associated with the vehicle and at least one of the wireless charging coils.

Preferably detection of the magnetic coupling comprises detection of a current or voltage in the at least one charging coil from a magnetic field produced by the vehicle magnetic coupling apparatus.

In one embodiment the method includes energising the vehicle magnetic coupling apparatus. The vehicle magnetic coupling apparatus may have a current provided in a coil of the apparatus which has a magnitude or frequency or phase which may be detected by the at least one wireless charging coils.

In another aspect there is provided a method for detecting a vehicle on a roadway comprising a plurality of wireless charging modules, the method comprising:

detecting a magnetic coupling between a vehicle magnetic coupling apparatus associated with the vehicle and a first wireless charging module, and detecting a change in coupling between a second wireless charging module and the first wireless charging module due to the presence of the vehicle magnetic coupling apparatus.

Those skilled in the art will appreciate that other aspects of the invention may become apparent from the following disclosure.

DRAWING DESCRIPTION

One or more embodiments of the invention will be described by way of example with reference to the accompanying drawings, in which:

FIG. 5a is a diagrammatic illustration of a vehicle coil moving over two pad structures provided in a roadway FIG. 5b is a side elevation of FIG. 5a.

FIG. 5c shows the pad structure of FIGS. 5a and 5b in plan and elevation.

FIG. 5d shows a diagrammatic overview including coupling factors between the coils shown in FIG. 5(a) to (c).

DETAILED DESCRIPTION

The description below describes a method and apparatus for detecting the presence of a vehicle. The vehicle has a vehicle pad which is a magnetic structure including one or more coils for receiving or intercepting a magnetic field created by one or more primary pads provided on or in the roadway on which the vehicle is traveling. Primary pads are also magnetic structures having one or more coils. These coils are selectively energised typically in sequence, to create a magnetic field when the vehicle pad is in proximity to receive the magnetic field produced by the energised coil. Thus primary pads, or at least the coils of primary pads, are normally in a de-energised state, but need to be energised at the correct time when the vehicle is in the correct location relative to the primary pad, so that power is transferred to the vehicle. Once the vehicle has passed the primary pad, the primary pad is then de-energised again. In one aspect detection is performed by detecting changes in coupling between neighbouring primary pads also referred to herein as ground pads or charging modules) in the roadway. If a roadway vehicle charging system such as that described with reference to FIG. 1 is used, then the detection method can be implemented without using any additional hardware and without requiring any external sensors, so the system is very robust and inexpensive to implement.

Figure 1:
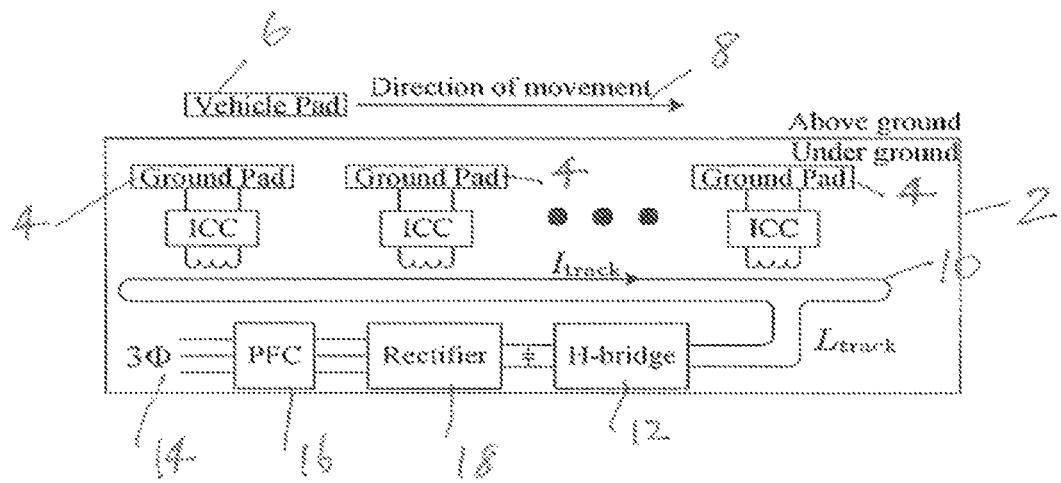
FIG. 1 is a diagrammatic view of a known type of dynamic roadway vehicle wireless charging system.

Those skilled in the art will appreciate that this disclosure is also applicable to systems other than those of the general form described in FIG. 1. This disclosure is applicable to other systems that may or may not have a series of primary magnetic structures that are spaced at a distance such that coupling, or a change in coupling between two or more pads can be detected due to the presence of a secondary magnetic structure.

A first embodiment of the invention will now be described. The changes in coupling are detected by detecting or sensing variations in the free resonant current developed in neighbouring primary pads created due to the small variations in coupling between neighbouring pads. The increasing coupling between the primary pad from the approaching secondary pad may also be used as the detection means. These variations in the free resonant currents may be detected by current transformers which are already present to help monitor and control the primary pad current. Measurement may be performed of current in a coil, or in an inverter associated with a coil. By observing the magnitude of the free resonant currents, the upcoming secondary pad can be accurately detected regardless of what magnetic topology is used for both the primary and secondary pads, and ideally regardless of various types of inverter topologies. The proposed method is also able to detect the secondary pad even if it is unenergised and can be used with a variety of primary inverter topologies, for example H bridge driving various compensation circuits such as a series LC, LCC, LCL as well as the typically current sourced converters such as push-pull converters. The only condition that is required for this detection technique to work is that the pads are spaced in such a way that it is possible for a voltage or current to be induced in a neighbouring primary pad when the vehicle transitions from one pad to the next.

Figure 2:
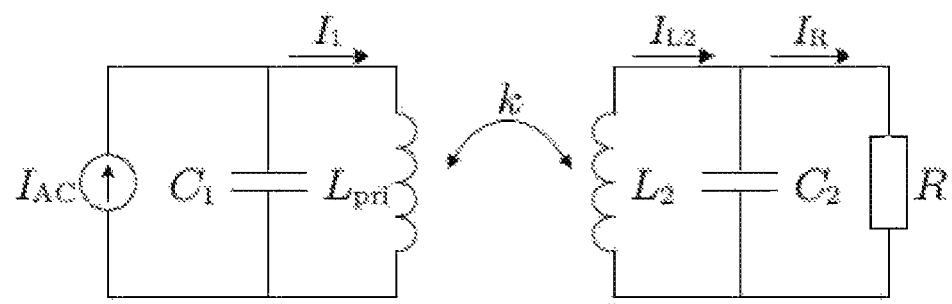
FIG. 2 is a simplified circuit diagram showing a coupled IPT system.
Figure 3:
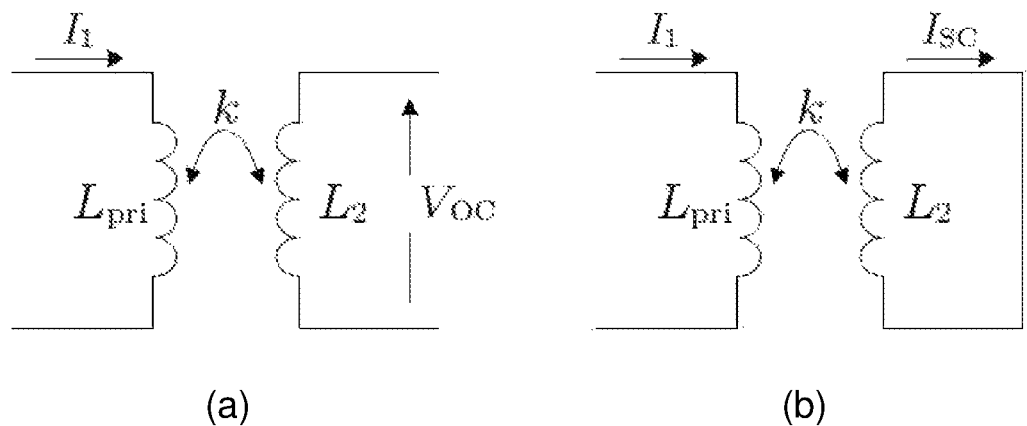
FIG. 3a shows measurement of the open circuit voltage in the system of FIG. 2.
FIG. 3b shows measurement of short circuit current in the system of FIG. 2.

Some fundamentals of IPT will now be described to assist with understanding the detection method. A simple IPT circuit is shown in FIG. 2 where the groundpad $L_1$ which is tuned by the capacitor $C_1$ is magnetically coupled by the coupling factor k to the vehicle pad $L_V$ which is tuned by $C_2$. $L_G$ and $L_V$ are tuned to the desired frequency of operation (85 kHz is the example assumed for much of the following disclosure) as shown:

$$\omega = \frac{1}{\sqrt{L_G C_1}} = \frac{1}{\sqrt{L_V C_2}}. \tag{1}$$

The mutual inductance (MGV) between LG and LV is given by:

$$M_{GV} = k\sqrt{L_G L_V} \tag{2}$$

where k is the coupling between the two inductors.

When LG is excited by a sinusoidal current, the voltage induced in LV (also referred to as the open circuit voltage $-V_{OC}$) shown in FIG. 2 (a) and its short circuit current ($I_{SC}$) shown in FIG. 2 (b) is given by:

$$V_{OC} = j\omega M_{GV} I_1 \tag{3}$$

$$I_{SC} = \frac{V_{OC}}{j\omega L_V} = \frac{M_{GV} I_1}{L_V}. \tag{4}$$

Figure 4:
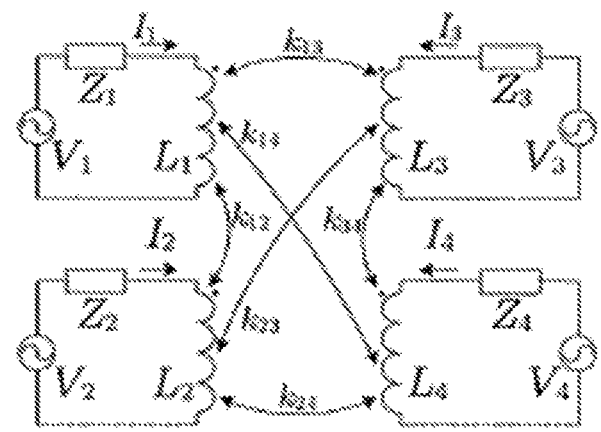
FIG. 4 shows a circuit diagram of a coupled IPT system with three coils, coil $L_1$ representing a coil provided on a vehicle, and coils $L_2$ and $L_3$ representing coils provided in a roadway.

The currents flowing in a system having three coils with only one coil energised as shown in FIG. 4 can be obtained by solving the linear system. Furthermore, a generalised system can be written for an n-coil system. These equations will be used to enable steady state analysis of many of the systems presented in this specification and allow many features to be taken into account such as the losses in the components which are represented as equivalent series resistances and imperfect tuning conditions.

To provide an example to describe an embodiment of the method, a simple simulation of a dynamic charging system consisting of two ground pads and a vehicle pad has been set up in the 3D magnetic FEM program JMAG as shown in FIG. 5(a). A similar set up is used to experimentally validate the simulation as described further below. In this embodiment, the spacing between the ground pads was chosen so that the minimum $I_{SC}$ of the vehicle pad when it transitions between the two ground pads is 35 A when both ground pads are energised. This ensures that the vehicle will always be able to draw 10 kW assuming it uses a 300 V bus. For the sake of this example the primary or ground pads are assumed to be driven by a constant current source of 100 A which can be practically achieved with an LCL converter. The ground pads use the DD magnetic topology described in International patent publication WO2010090539 in order to produce a horizontal field while the vehicle pads could utilise the DD, DDQ or the bipolar magnetic topology such as that described in International Patent Publications WO2011016731 and WO2012018269. In this case the bipolar magnetic topology was used. The person skilled in the art will appreciate that the magnetic topology is not critical, since the proposed detection scheme will work with all magnetic topologies suitable for power transfer including circular pads and ferrite-less ground pads, provided pads are located in sufficient proximity to each other and/or the vehicle pad contains a suitable permeable material, such as ferrite for example.

Figure 5:
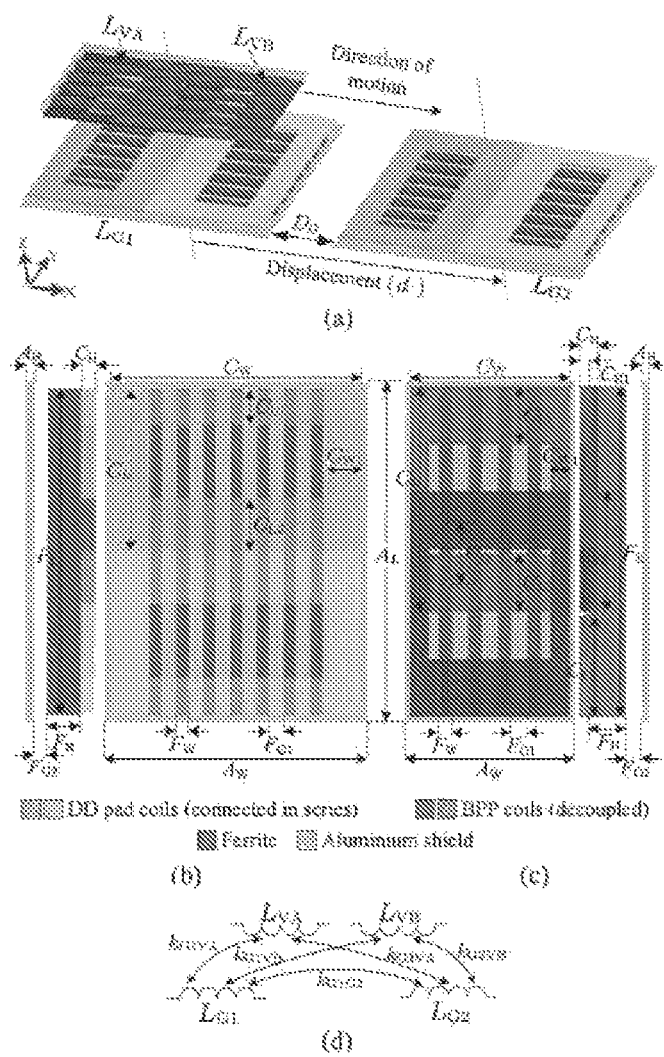
Figure 6:
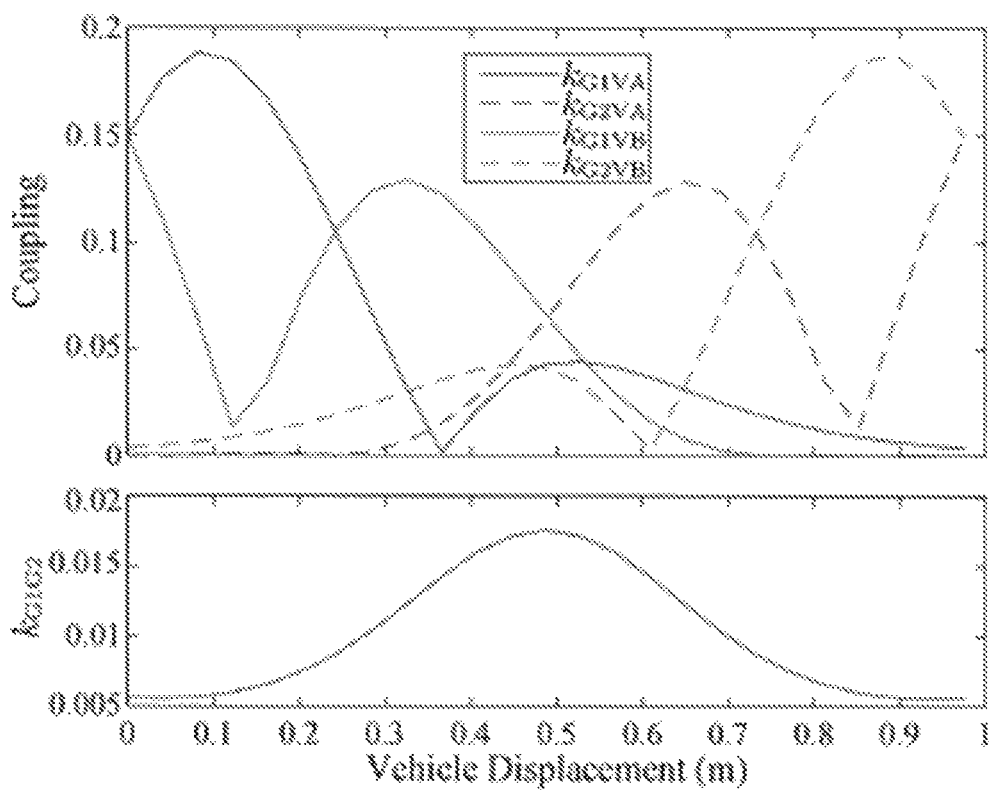
FIG. 6 shows plots of coupling against displacement as a vehicle pad moves relative to two stationary pads.
Figure 7:
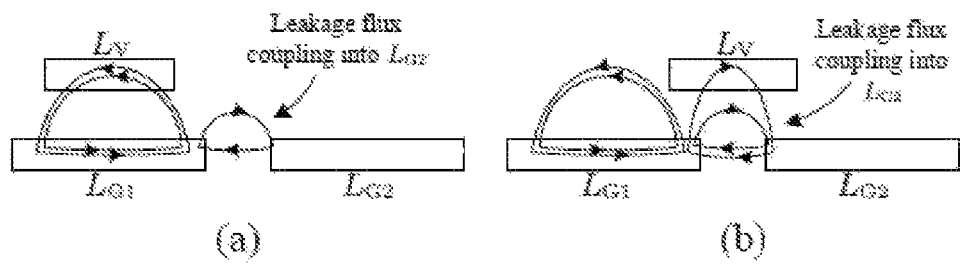
FIG. 7a shows diagrams of coupling between two ground pads and a vehicle pad when viewed in side elevation, FIG. 7a showing the vehicle pad centred over a first ground pad, and FIG. 7b showing the vehicle pad located between the two ground pads.

As the vehicle pad moves over the ground pads as shown in FIG. 5, there is a variation in coupling factors between all three pads in the system as shown in FIG. 6. The coupling between the ground pads and the vehicle pads ($K_{G1V}$ and $K_{G2V}$) increases when the vehicle pad is between the two ground pads. This is because when the vehicle pad is centred on the ground pad there is very little leakage flux generated by the energised ground pad that can be coupled into the neighbouring ground pad as indicated in FIG. 7(*a*) since the flux or field is mostly attracted to the vehicle pad. When the vehicle pad is between the two ground pads the leakage magnetic flux coupling from the energised ground pad into its neighbouring ground pad increases since the ferrite in the vehicle pad gives the flux an alternative magnetic path or pathway to flow through as indicated in FIG. 7(*b*). This enhancement of the leakage field occurs since the spacing of the ground pads is designed to ensure that the vehicle can draw power almost continuously from the roadway, ideally 10 kW, in all positions. If the ground pads were spaced further apart the variation in coupling between neighbouring ground pads might be too low to work as a reasonable means of detection.

Figure 8:
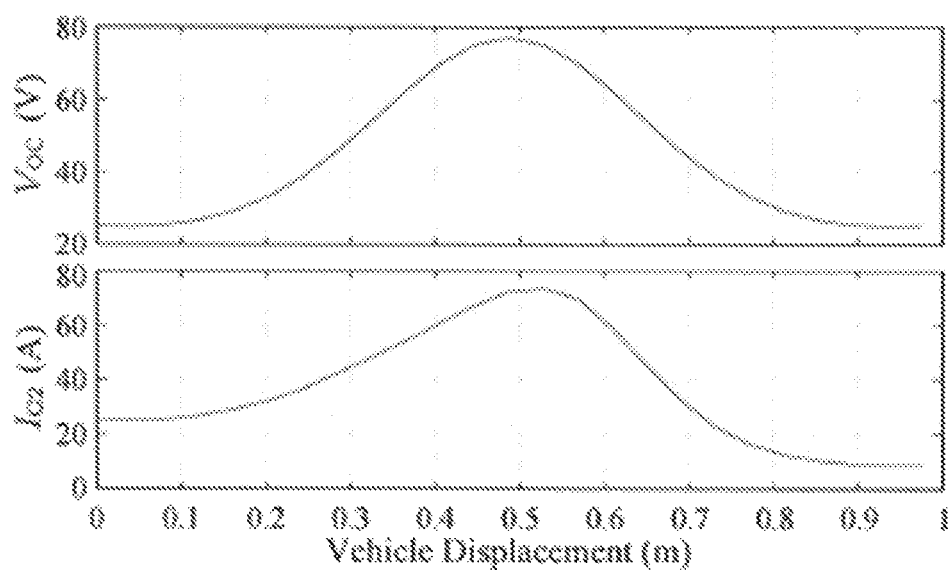
FIG. 8a shows open circuit voltage induced in a ground pad against displacement of the vehicle pad.
FIG. 8b shows the plot of three current resonant build up in a tank circuit associated with the ground pad against displacement of the vehicle pad relative to the ground pad.
Figure 9:
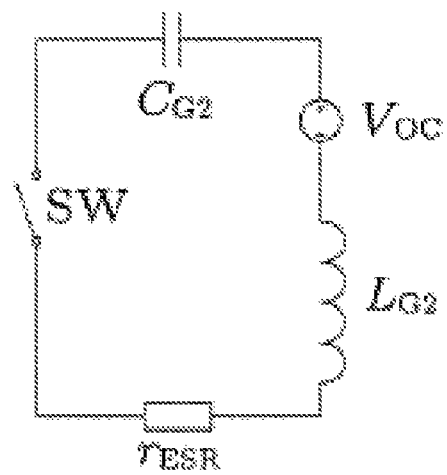
FIG. 9 shows an equivalent circuit for the build-up of free resonant current referred to the preceding Figure.

The voltage induced in the neighbouring pad is shown in FIG. 8(*a*). While this voltage of 25 V to 75 V is suitably large for detection means, it is very small compared to the several kilovolts that appears across the pad when it is energised, so any detection circuit that attempts to detect this change in induced voltage has to also withstand several kilovolts, making this approach less desirable. However, if the switching network is operated in such a way when it is not trying to deliver power so that it configures the LC circuit to resonate in the presence of a coupled voltage at a frequency at or near its tuned point, a large current can build up in the LC tank, allowing for easy detection. The practical implementation of how to allow the resonant currents to build up depends on the power supply topology and will be discussed further below. Most converter topologies can be simplified to a single switch as shown in FIG. 9 when not transferring power, and here $V_{OC}$ is the voltage induced by $L_{G1}$, $C_{G2}$ is the tuning capacitor to tune $L_{G2}$ and $r_{ESR}$ is the AC resistance of all the components in the loop.

The steady state current induced in the pad as the coupling varies is shown in FIG. 8(*b*). It can be seen that the nominal current when the vehicle is centered above the pads is approximately 25 A and it increases to approximately 70 A as the vehicle moves between the two ground pads. As noted earlier, the current transformer present in the loop is usually used to monitor the current in the ground pads, this change in free resonant current from 25 A to 70 A (or similar based on application) can be used as a means of detection.

Figure 10:
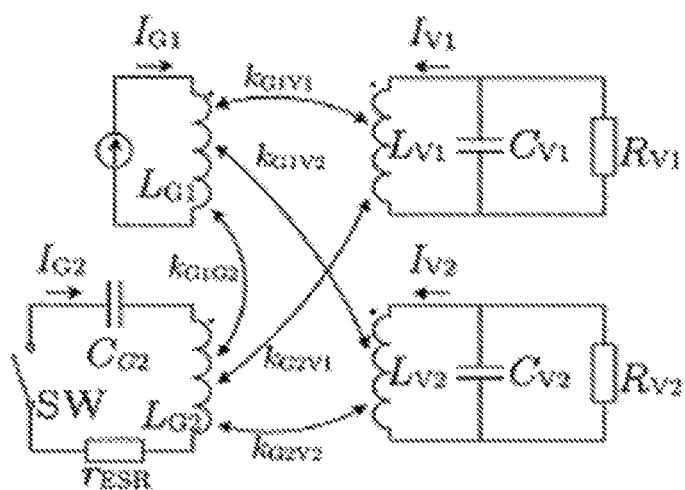
FIG. 10 shows an equivalent circuit which is used to model the effects of energized coils on free resonant current.
Figure 11:
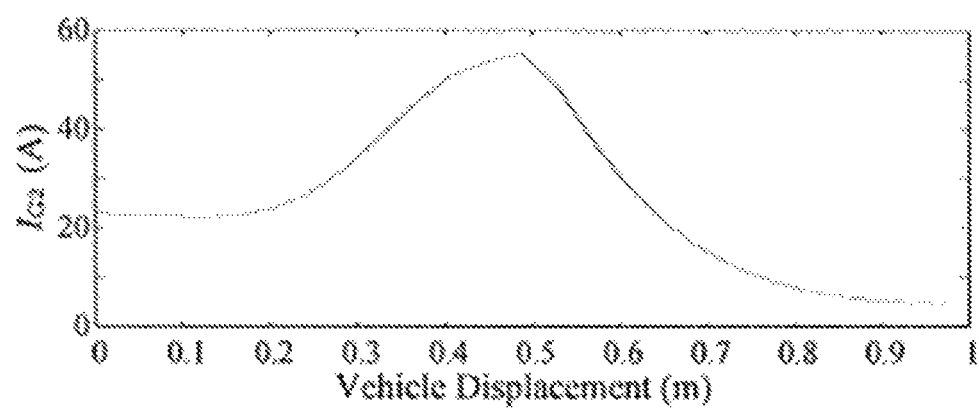
FIG. 11 shows a plot of free resonant current build up which includes the effects of an energised vehicle pad.

The analysis above has assumed that the vehicle pad has no current flowing through it and that no power is being drawn. The proposed detection scheme also works when the vehicle pad is energised. To validate this, the circuit to model this system is shown in FIG. 10 and the change in the free resonant current flowing through $L_{G2}$ is shown in FIG. 11 with the vehicle pad energised. In this example the loaded quality is adjusted to draw 10 kW while limiting the maximum loaded Q factor of the secondary to 10.

It can be seen in FIG. 11 that the free resonant current in the neighbouring ground pad $L_{G2}$ still produces a clear current signal which allows detection of when the vehicle pad is centred between the two neighbouring (adjacent) ground pads.

Figure 12:
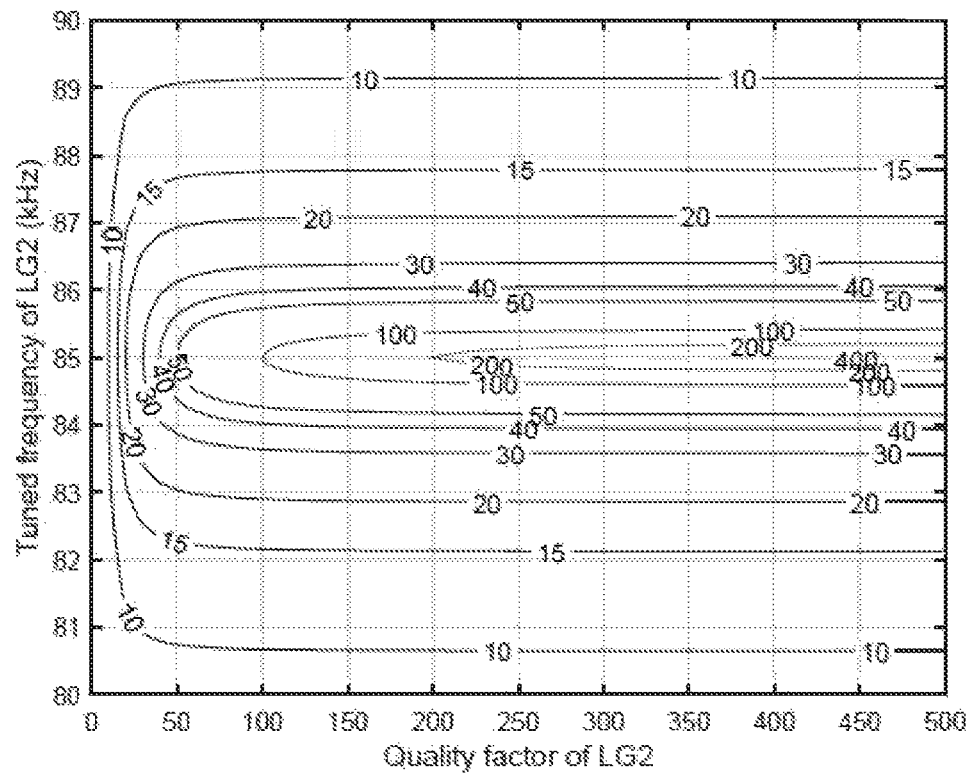
FIG. 12 is a contour plot showing pre-resonant current variation as tuned frequency and an equivalent series resistance varies at k=0.01.

As noted earlier, the functionality of the presented circuit largely depends on the free resonant LC tank being tuned to approximately the same frequency as the energised primary as well as having low losses. This can be observed in FIG. 12 which shows contour curves of the resonant current that builds up as the frequency and losses changes at k=0:01. It can be seen that as the system is detuned, the resonant current decreases, making it more difficult to detect the change in free resonant currents. The resonant current also decreases as the ESR of the LC tank increases however if the ESR is very low then the current increases towards infinity. However, any free resonant current detected in the unenergised neighbouring ground pad will still approximately triple given the coupling factor approximately triples as the vehicle travels off the center of the energised ground pad. This means that this relative change in current magnitude can be detected as long as the current reading is of a high enough resolution.

As mentioned previously, the free resonant current detection scheme can be implemented on multiple electronic topologies, however each topology has a slightly different way of implementing it. The implementation of the detection scheme with an H-bridge series tuned, H-bridge LCL tuned and a push-pull inverter is discussed below.

Figure 13:
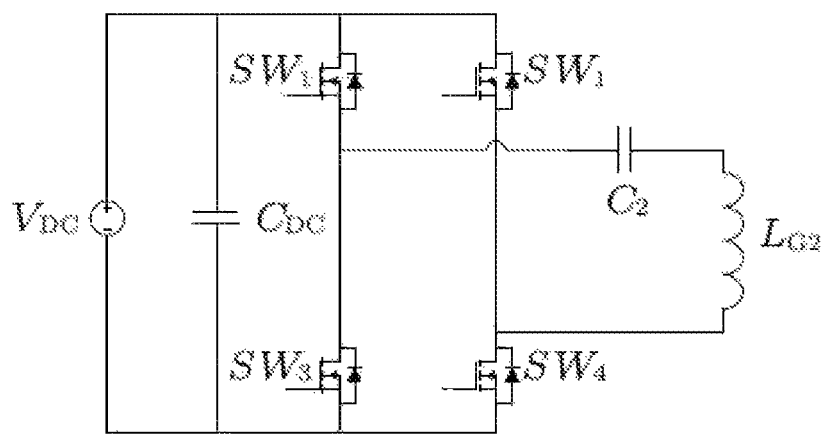
FIG. 13 shows a circuit diagram of a series tuned power supply.

A series tuned LC power supply is shown in FIG. 13. Typically, when the power supply is shut down all four switches are left open. To allow the circuit to freely resonate the bottom switches need to be closed while leaving the top switches open. When this happens the circuit can essentially be redrawn as FIG. 9. This circuit has already been analysed above, however one of the disadvantages with the circuit is that continuously having some current flowing through the coils can introduce additional loss which is not necessary. To get around this issue the converter can operate the bottom switches in such a manner so that it only allows pulses of resonant current to build up within the LC tank. By operating the circuit in the short circuited state 10% of the time and open circuited the rest of the time, the losses in the free resonant coil can be significantly reduced.

Figure 14:
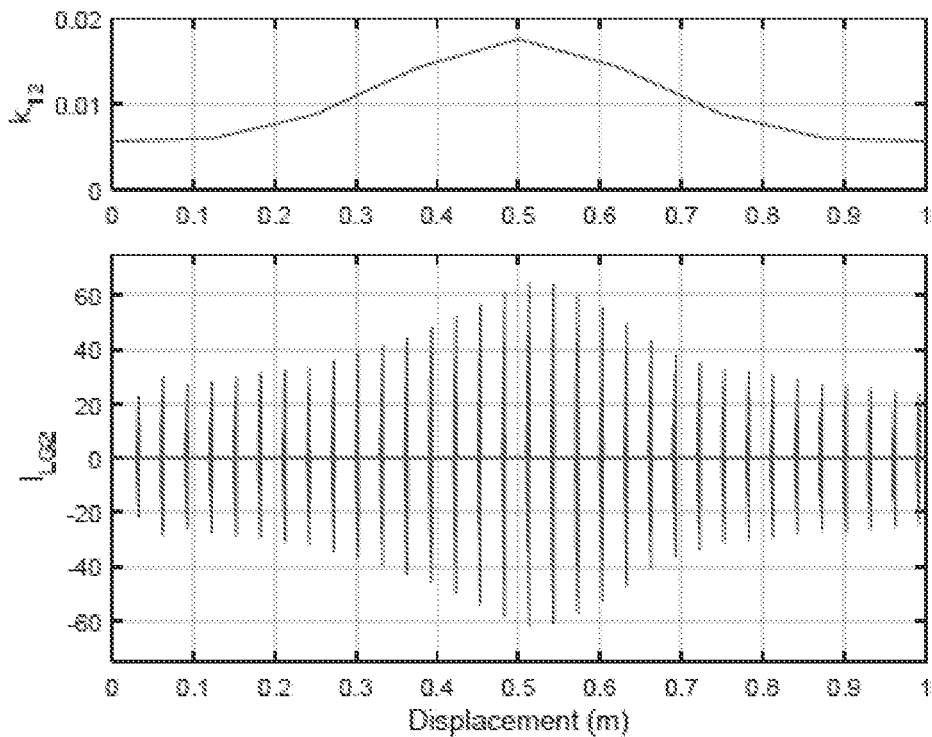
FIG. 14 shows plots of coupling and pre-resonant current plotted against displacement with pulsed operation.
Figure 15:
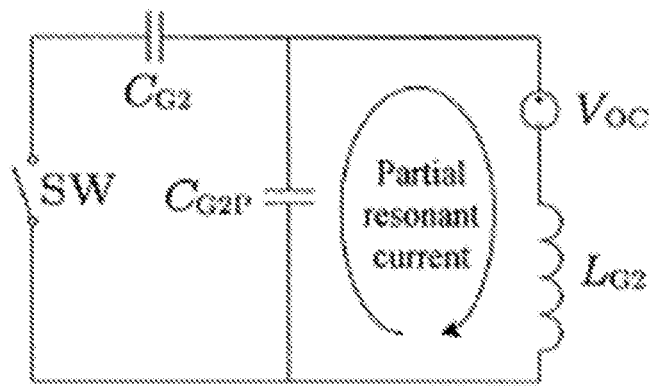
FIG. 15 shows a simplified circuit diagram of free resonant current build up with partially parallel compensated series (LCC) tuning.

This pulsed operation of the H-bridge is shown in FIG. 14 where the LC tank is only short circuited for 10% of the time at a low frequency of 1 kHz. When the switches are opened the energy in the LC tank is discharged into the input DC bus capacitor through the body diodes of the MOSFET. However, since there is very little energy in the LC tank compared to the DC bus capacitor, the energy decays within one cycle. The pulsed operation of the H-bridge will not be as effective in a series LCC circuit if a partially parallel tuned circuit is used as shown in FIG. 15. When the bottom switches of the H-bridge are opened up, resonant currents can still circulate within the loop created by $L_{G2}$ and Cparallel. The amplitude of these circulating currents will however be lower as expected from FIG. 12 since the circuit will not be perfectly tuned. This will mean that when the H-bridge is opened the circuit will still resonate but at a lower current instead of decaying to 0 A with the series LC circuit.

Figure 16:
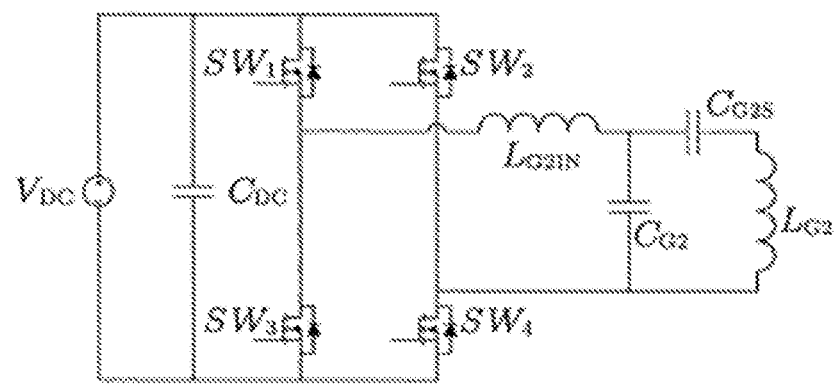
FIG. 16 shows a bridge circuit driving an LLC compensation circuit (ignoring capacitor $C_S$), or the power supply using LCCL compensation circuit (if capacitor $C_S$ is used).

The typical configuration of an LCL and LCCL tuned power supply is shown in FIG. 16. The LCL filter is tuned to the operating frequency by choosing values of $C_1$ and Lin such that $C_1$ and $L_1$ as well as C1 and Lin are tuned to w as shown in (6). Often this is achieved by making Lin equal to $L_{G2}$.

Figure 17:
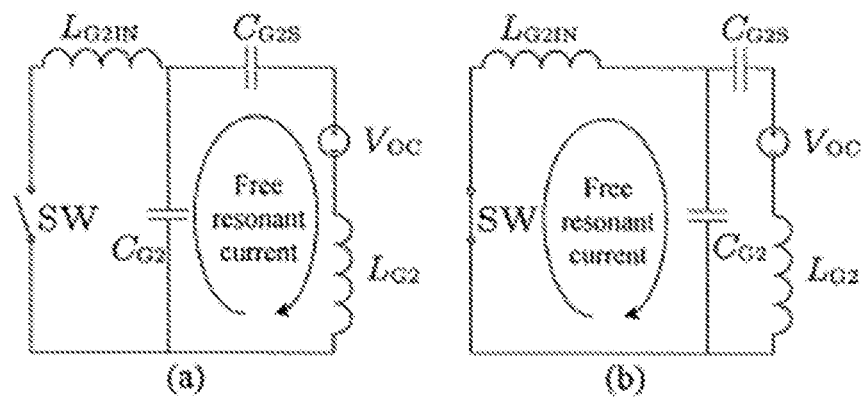
FIG. 17 shows an equivalent circuit showing three resonant current build up when the LCL filter is a) open, and b) shorted by the H bridge.

The tuning equation for the LCL converter (6) can be modified for the LCCL converter by aking Lin equal to the combined impedance of $L_{G2}$ and $C_S$ when operating at was shown:

Due to the way the circuit is tuned, the large resonant current can be observed in two places—both within the pad when the H-bridge presents an open circuit and within $L_{in}$ when the H-bridge presents a short circuit to the filter as shown in FIGS. 17(*a*) and (*b*) respectively.

When the H-bridge presents an open circuit (by having all the switches open) there is no current that flows through and a large resonant current that flows through $L_{G1}$ which can be detected by the current transformer which monitors the pad current. However if the LCL filter is shorted by turning on both of the bottom switches of the H-bridge, no current will flow through $L_{G2}$ and the free resonant current will build up in $L_{in}$. The resonant current in $L_{in}$ can be detected by the current transformer that monitors the bridge current.

Unlike the series tuned supply in above, the resonant current cannot be turned off so the inductor which should be used for resonance should be chosen by using the lowest loss inductor. However, as a result of this the circuit is not impacted by any partial tuning of either the $L_{in}$ or $L_{G1}$.

Figure 18:
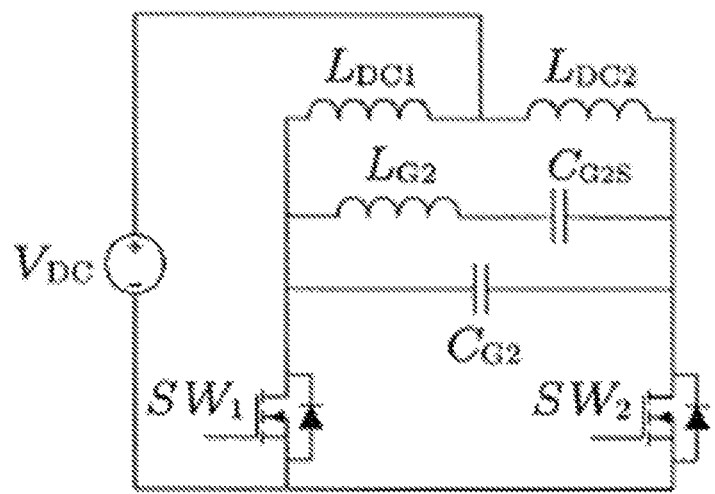
FIG. 18 shows a pushable converter with optional partial series compensation and capacitor $C_S$.
Figure 19:
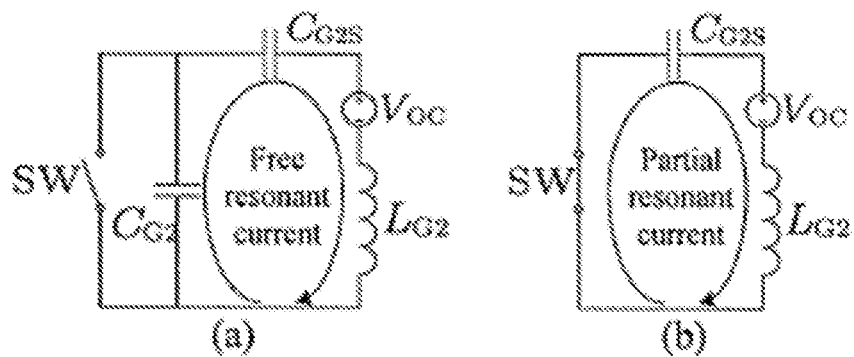
FIG. 19 shows an equivalent circuit which shows build up of free resonant current with the push pull converter referred to the preceding Figure.

The push-pull inverter such as the one shown in FIG. 18 can also utilise the free resonant current in order to detect upcoming pads. Typically $C_1$ is selected so that it tunes $L_{G2}$ to w similar to how an LCL circuit is tuned in (6). Sometimes an optional partial series compensation capacitor $C_S$ is used to increase the current through $L_{G2}$ in which case the equivalent inductance $C_1$ should be tuned to the equivalent inductance of $L_{G2}$ and $C_S$ similar to how the LCCL circuit is tuned in (7). The equivalent circuit of the converter when it is operating in free resonant mode is shown in FIG. 19. When the switch is open (corresponding to both push-pull converter switches being open) the parallel tuned resonant tank is allowed to resonate freely. However when the resonant switch is closed (corresponding to both push-pull converter switches being closed) the pad is effectively shorted so the resonant currents will not build up.

Instead the short circuit current will flow through the pad if $C_S$ isn't used. If the partial series compensation capacitor $C_S$ is used then some resonant currents will still circulate within $L_{G2}$ and $C_S$ however the amplitude of these circulating currents will be low since $L_{G2}$ and $C_S$ do not resonate at w.

The detection scheme with the push-pull converter is similar to the series tuned circuit because the pulsing approach can also be used with the push-pull converter. However if the circuit is partially series tuned then some resonant current will still build up as is the case with the series tuned power supply.

Figure 20:
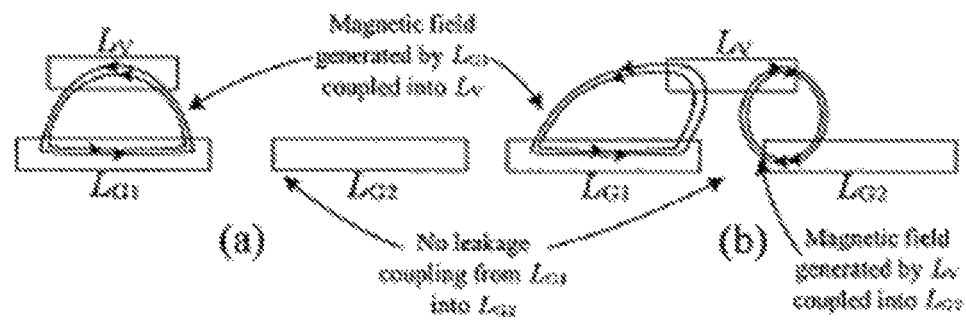
FIG. 20 shows magnetic fields coupled between ground and vehicle pads when there is no coupling between $L_{G1}$ and $L_{G2}$ when (a) the vehicle pad is above $L_{G1}$ and (b) when the vehicle pad is between $L_{G1}$ and $L_{G2}$.
Figure 21:
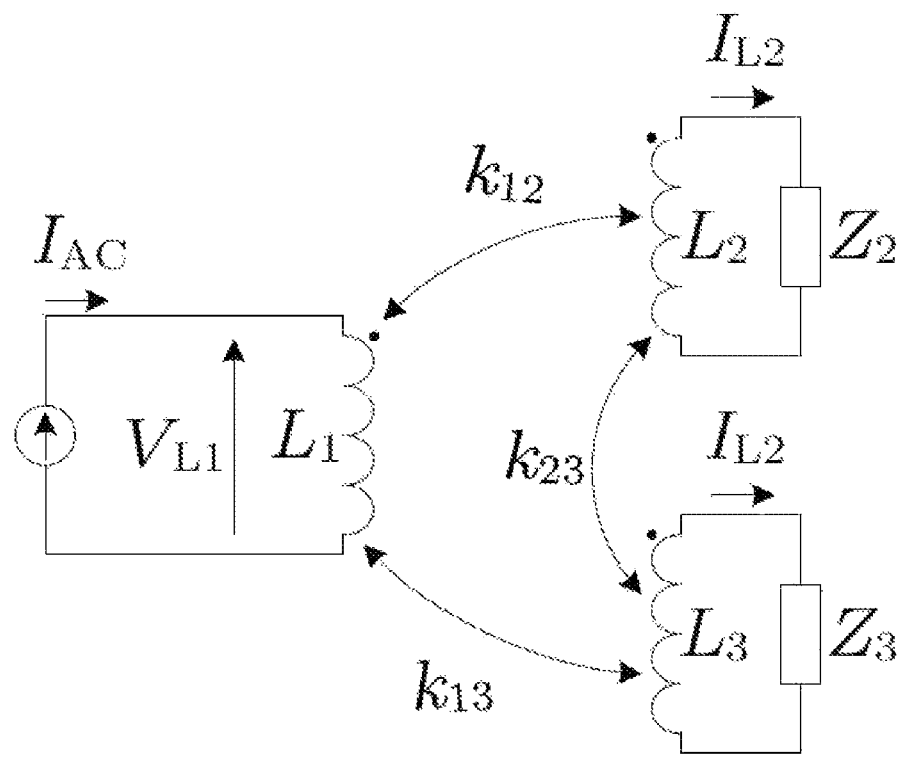
FIG. 21 shows an equivalent circuit of the two ground pad and vehicle pad system.

In another embodiment, the current flowing within the approaching vehicle magnetic coupling structure (i.e. the coil) can be detected by the approaching vehicle pad as shown in FIGS. 20(*a*) and 20(*b*). In FIG. 20(*a*) the vehicle pad is above $L_{G1}$ so there is effectively no magnetic fields generated by $L_V$ that couple into $L_{G2}$ since $L_V$ is far away from $L_{G2}$. However as the vehicle pad approaches the $L_{G2}$, the magnetic field generated by $L_V$ starts to also couple into $L_{G2}$ as shown in FIG. 20(*b*). Electrically this system can be drawn as FIG. 21 however since there is no coupling between $L_{G1}$ and $L_{G2}$, i.e. $k_{12}$ is zero. In other words, the detection system still works if $k_{12}$ is zero.

Figure 22:
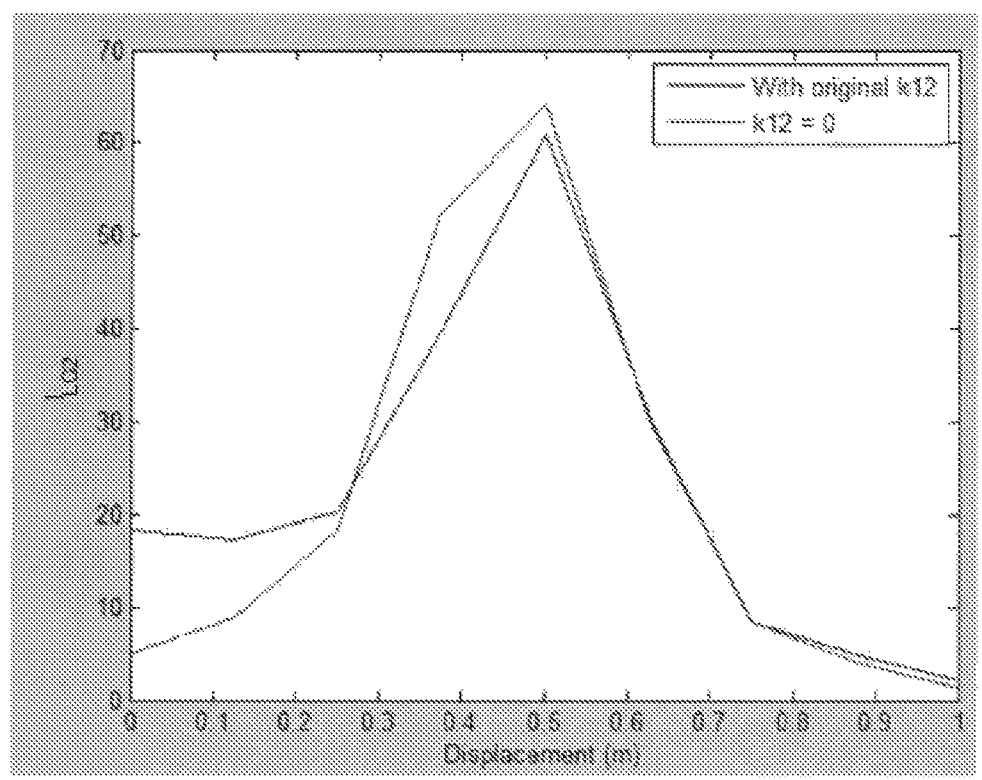
FIG. 22 shows a comparison of free resonant current amplitude with original $k_{12}$ and $k_{12}=0$

A simulation comparing the free resonant current induced when the effects of including the original $k_{12}$ is compared to setting $k_{12}$=0 is shown in FIG. 22. It can be seen that initially when the LV is above $L_{G1}$ (displacement of 0 to 0.3 m) there is approximately 20 A of free resonant current flowing with the original $k_{12}$ however there is less current with $k_{12}$=0 especially at zero displacement since there is almost no magnetic field from $L_V$ coupling into $L_{G2}$. As the vehicle moves into the gap between the two ground pads, the coupling between $L_{G2}$ and $L_V$ increases, causing a significant increase in $IL_{G2}$, even though there is no coupling between the two ground pads. After a displacement of 0.5 the $IL_{G2}$ starts to drop again however by now the power supply driving $L_{G2}$ should have detected the vehicle and turned on.

In FIGS. 20(*a*) and 20(*b*) and FIG. 22, the ground pad $L_{G1}$ is transferring power to $L_V$ so there is a current flowing through the vehicle pad. This current in the vehicle pad generates the magnetic field that induces the free resonant currents in $L_{G2}$ which are used for the detection. The detection scheme does not have to be limited to just the vehicle pad though if the vehicle used intermediate couplers to improve power transfer between the ground pad and the vehicle then the current generated by the intermediate couplers will induce free resonant currents in the upcoming ground pad which can also be used as a means of detection. In fact, any energised coil(s) which has an increasing coupling to the next ground pad as the vehicle approaches that ground pad can be used as a means of detection. This can be realised potentially having a detection coil at the front of the vehicle which is simply used to indicate to the upcoming vehicle pads that the vehicle is approaching. The frequency and amplitude of the current in this detection coil can also be adjusted to indicate to the ground pad information about the desired primary current. Alternatively small detection coils which are energised can be laid under the ground, just before the next to the ground pad. The upcoming vehicle would increase the coupling between the detection coil and the next ground pad which can also be used as a means of detection.

The detection scheme shown in FIGS. 20(*a*) and 20(*b*) and FIG. 22 currently works because the two ground pads are still close enough so that the vehicle pad is still coupled to both ground pads. However if the highway system was designed so that there are large gaps between the ground pads (say 0.5 m or even higher) then the vehicle pad can simply be energised to indicate to the next ground pad that it is approaching. An easy way of implementing this type of detection scheme is to use an active rectifier such as the ones used in bidirectional wireless charging systems. If the active rectifier keeps switching even after it has stopped receiving power from the previous ground pad then the vehicle pad will still have currents flowing within it. Once the vehicle gets close enough to the next ground pad, the current flowing in the vehicle pad will induce free resonant currents in the next ground pad which will indicate to the ground pad to turn on.

If a traditional passive rectifier is used, the currents in the vehicle pad would stop as soon as the ground pad is no longer transferring power to the vehicle pad so an active switching rectifier or an additional inverter on the vehicle side is required to energise the vehicle pad, or the ground pads need to be placed closer together in the road. In one embodiment, the vehicle pad can be energised using a minimal amount of power, so that a field which is sufficient for detection is produced, to ensure that the detection process is efficient.

An energised vehicle pad can also be used to indicate to the first ground pad to turn on in a new series of ground pads, so the vehicle pad can start the chain of all the other ground pads turning on in sequence as the vehicle passes over them. The operation of the chain of pads after the first pad has been turned on may be the same as that embodiment described above with reference to FIGS. 1-19. In some embodiments, both the embodiment of FIGS. 1-19 and the embodiment of FIGS. 20-22 may be used.

The free resonant current induced by any energised coil (regardless of if it is the previous vehicle pad coupling via $k_{12}$ or a vehicle with an active rectifier deliberately energising the vehicle pad) can be used to extract the following useful information about the source of the excitation current:

Frequency of the excitation current

Phase of the excitation current

Approximating the amplitude of the excitation current under controlled circumstances The frequency of the free resonant current will be exactly the same as the frequency of the excitation current. If the previous ground pad is running at say 84.2 kHz then the current that flows through the vehicle pad will also be 84.2 kHz so the free resonant current induced in the upcoming ground pad will be 84.2 kHz. This can be detected fairly easily and the next power supply can be energised at exactly 84.2 kHz.

Alternatively, in future if private vehicles use 85 kHz as their frequency to transfer power and larger commercial vehicles run at a different frequency (say 50 kHz) then this can be detected easily. The private vehicles would energise their vehicle pads at 85 kHz to indicate to the ground pads that it wants to run at 85 kHz and the commercial vehicles would energise their vehicle pads at 50 kHz to indicate that it wants to run at 50 kHz. The practical implementation of this would require the tuned circuit in the upcoming ground pads to be tuned to a similar frequency. For example, consider a situation where 50 kHz excitation current is used to indicate to the upcoming ground pad which has its filter set to 85 kHz then the amplitude of the free resonant current would be very low. It will probably still be possible to detect that it is a 50 kHz signal and switch the tuning to '50 kHz Mode' which would then give larger and more accurate readings.

The phase of the free resonant current will have some relationship to the phase of the excitation current. For example if the phase of the excitation current changes by 90° for whatever reason, this will be reflected by the same 90° phase change in the free resonant currents. This means that after the upcoming power supply runs through a calibration phase where it energises its coils to figure out how it is tuned, the upcoming power supply will be able to energise its ground pad at an exact phase angle relative to the excitation current.

If the system is designed so that the coupling between the ground pads is used as a means of detection then the upcoming pads can detect the phase of the excitation current and turn on to match that exact angle. With existing systems this is beneficial because if the ground pads are operated out of phase then the ground pads may start transferring power between themselves. The phase detection is also useful if the system is designed so that the vehicle pad indicates to the ground pad when to turn on by using an active rectifier to generate currents in the vehicle pad. The phase of the ground pad can be set to be 90° leading or lagging relative to the phase of the primary current to transfer power in whichever direction desired.

In FIG. 22 the initial current of the blue trace (when there is coupling between the ground pads) is approximately 20 A at a displacement of 0 m (when $L_{G1}$ is energised at 100 A). If the graph was to be extended back to −1 m then the current reading will still be approximately 20 A assuming $L_{G1}$ was still energised at 100 A since $k_{12}$ would not have changed. However if $L_{G1}$ was energised at only 50 A then the initial free resonant current reading in $L_{G2}$ would be approximately 10 A. This means that if $L_{G1}$ is energised at different current levels depending on what the vehicle is then $L_{G2}$ can detect what current $L_{G1}$ is operating at and match that current.

However, this requires additional information the power supply for $L_{G2}$ needs to know that when it sees an initial free resonant current of 20 A it corresponds to $L_{G1}$ being energised at 100 A. This information can be provided by giving the power supply the nominal value of $k_{12}$ and have it figure out the rest based on how it is tuned using a self-calibration routine or simply telling it that a 20 A reading corresponds to 100 A in the code.

In the simulations we were able to detect a pad turning on from 2-3 pads away because the free resonant current in one pad induces another smaller free resonant current in the next pad.

One of the common questions with bidirectional charging systems, is how the primary and secondary synchronise themselves since bidirectional systems rely on having an accurate phase difference between the primary and secondary inverters. The proposed detection scheme can help synchronise the primary and secondary inverters by following the following steps:

1. The vehicle inverter starts to energise the vehicle pad. This creates free resonant currents within the ground pad if the ground pad is sufficiently coupled.

2. Detect the frequency of the free resonant current—this is the frequency that the ground inverter needs to operate at.

3. Measure the phase of the free resonant current and do a look up with existing tuning data from the self-calibration routines to determine the phase of the current in the vehicle pad.

4. Drive the inverter at the detected frequency and at ±90° to the phase of the current in the vehicle pad.

The detection scheme would be impacted by slight changes in inductance due to the pads being aligned/misaligned, but this may also be accounted for in the design of the system implementation.

Other information can also be passed along via the free resonant method. For example the power supplies can pulse their pads on/off to 'transmit' a binary signal or may be 'transmit' a modulated signal too when there is no vehicle pad present.

In FIG. 22 the peak free resonant current occurs at a displacement of 0.5 m. However inverter does not need to wait till the displacement of 0.5 m to turn on the next ground pad. For example—the power supply can detect that the free resonant current has increased to approximately 35-40 A from an initial current of approximately 20 A. This is a good enough indicator to turn on the power supply. The power supply does not need to wait till the current is 60 A to turn on.

Figure 23:
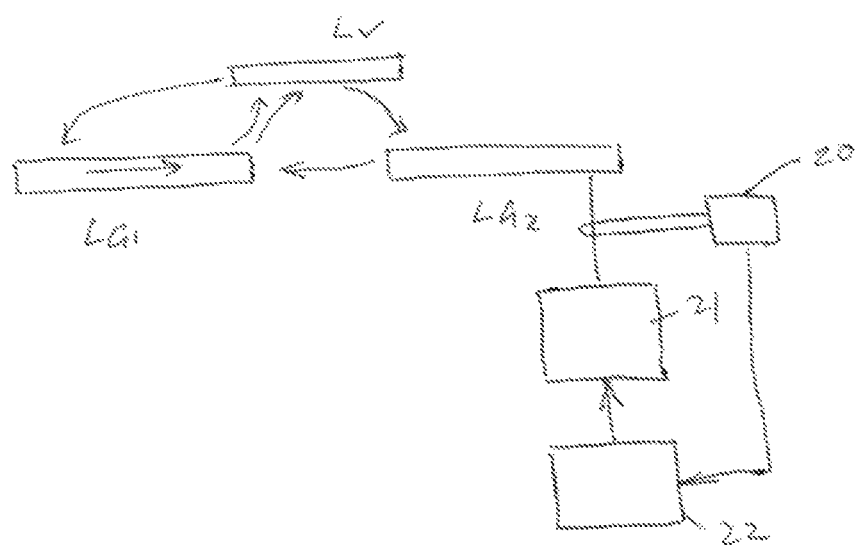
FIG. 23 shows a diagrammatic system for detecting and supplying power inductively to a vehicle.

In FIG. 23 an illustration is shown of implementation of the system. Converter 21 includes switches as described above that are operable by controller 22 to drive $L_{G2}$ so that it may be energised or de-energised, and to allow the pad to be provided in an appropriate state to receive or sample induced free resonant currents. The free resonant current induced in is detected by a sensor such as current transformer 20, and information on the magnitude or change in magnitude of the free resonant current is passed to controller 22. When a certain property of the current is detected (for example a threshold magnitude) then the controller can instruct the converter 21 to energise the pad so that power is made available wirelessly to the vehicle whose movement caused the induced current in $L_{G2}$.

Figure 24:
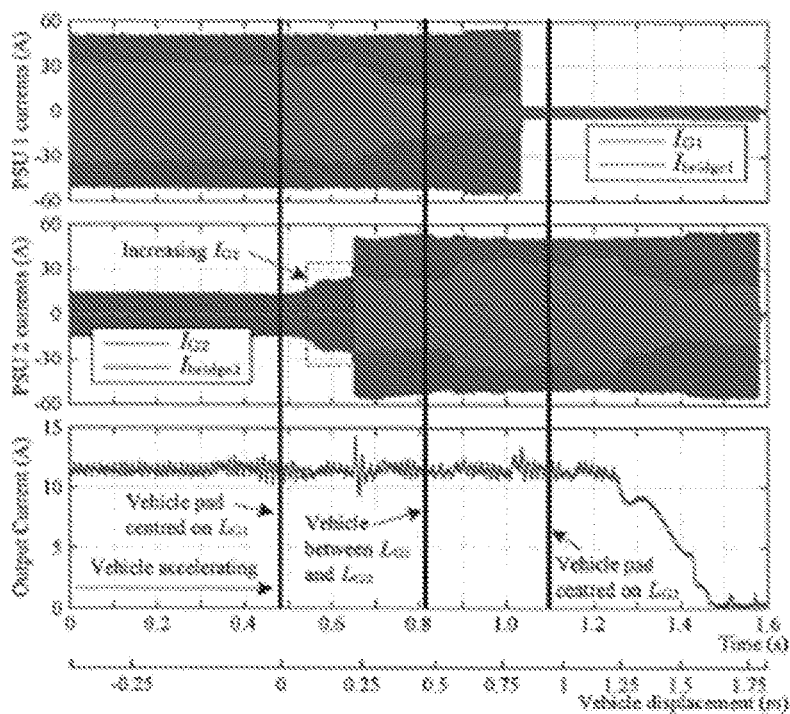
FIGS. 24 and 25 show oscilloscope traces for a simulated system.

To experimentally test the system a PLECs simulation was created with four ground pads energised by LCL power supplies. The results are shown in FIG. 24 where the four ground pad currents and the output DC current are plotted. The dotted red lines indicates the times when the vehicle pad is centred on top of each ground pad. It can be seen that as the vehicle pad moves from $L_{G1}$ to $L_{G4}$ each power supply turns on and off to energise each ground pad at 100 A. A switching secondary regulator was used to regulate the output current to approximately 33 A which was fed into a 300 V load to deliver 10 kW continuously. The detection of the vehicle pad was implemented by the power supply monitoring the free resonant current in the ground pads. The vehicle pad was turned on when the free resonant current reached 50 A. This ensures that the next ground pad is energised before the vehicle pad is in the gap between the ground pads. The power supply is turned off when the bridge current gets low, indicating that the power supply is no longer delivering power to the vehicle.

The nominal component values used for the simulation are listed in Table II.

TABLE II

NOMINAL COMPONENT VALUES USED IN THE DYNAMIC SIMULATION

| $L_{G1IN}$ | 9 µH | $L_{G1}$ | 81.9 µH | $C_{G1}$ | 394 nF |
|---|---|---|---|---|---|
| $C_{GiS}$ | 47 nF | $L_{V(A/B)}$ | 11.16 µH | $C_{V(A/B)}$ | 313 nF |
| $L_{DCout}$ | 200 µH | $C_{DCout}$ | 660 µF | $Q_L$ | 625 |
| $Q_C$ | 1000 | $V_{inDC}$ | 600 V | $V_{outDC}$ | 300 V |

Figure 25:
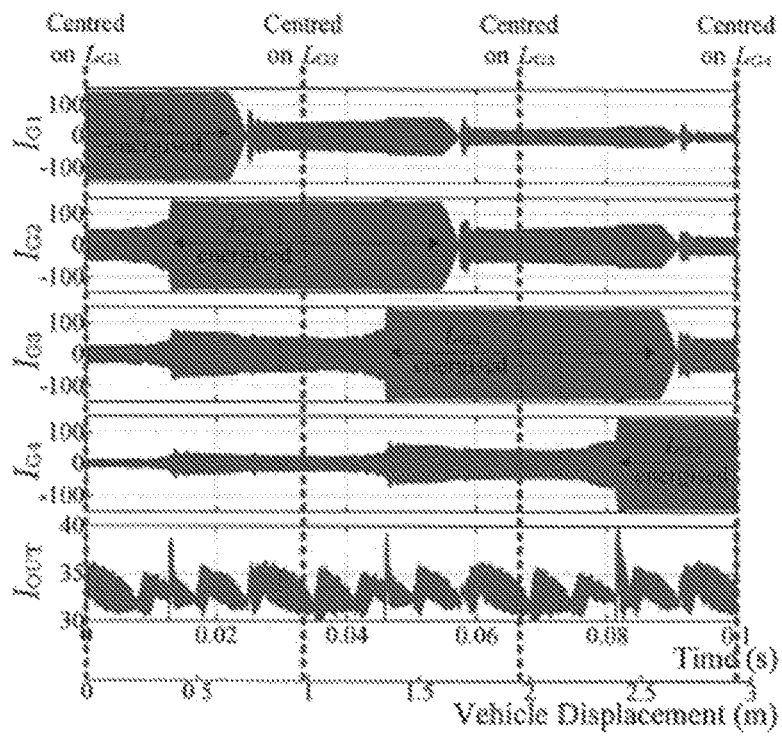

Oscilloscope traces of an experimental the vehicle detection are shown in FIG. 25. The vehicle pad initially started at a displacement of −0.322 m which was the furthest displacement where the vehicle was still able to draw 3.3 kW. The vehicle was accelerated so that it was travelling at approximately 6 km/h at vzero displacement where the vehicle pad is centred over $L_{G1}$. It can be seen that as the vehicle pad continues to move towards $L_{G2}$ the free resonant current ($I_{G2}$) starts to increase. The power supply detects this increase in current and automatically starts up the power supply for $L_{G2}$ when the free resonant current has reached 18 A. Both power supplies deliver power to the vehicle when the vehicle is transitioning from $L_{G1}$ to $L_{G2}$. After the vehicle pad crosses the center of $L_{G2}$ the output current starts to drop until it eventually reaches zero. If another ground pad was present then the next ground pad would need to detect the upcoming vehicle and turn on to ensure that the vehicle keeps receiving power. The power supplies shut down after they detect a sufficiently low bridge current which indicates that it is no longer supplying power. Throughout this experiment there was no wireless communications between the vehicle and ground pads and no extra detection hardware was used—all the detection was done by monitoring the free resonant currents. The only requirement was that the power supply for $L_{G1}$ had to be turned on to start with so that the resonant currents could be induced within $L_{G2}$. For a highway charging application, vehicle sensor coils such as those used to detect vehicles at traffic lights could be used to indicate to the first ground pad to turn on. After the first ground pad turns on, it will create a chain reaction of all the other ground pads turning on one by one as the vehicle moves over all of them.

From the foregoing it will be seen that reliable and robust detection electric vehicle detection systems and methods are provided.

The invention claimed is:

1. A method for supplying power to a vehicle on a path or roadway comprising a plurality of wireless power transfer coils, the method comprising:
   detecting a current or voltage induced in a de-energised wireless power transfer coil through mutual inductance with an energized wireless power transfer coil of the plurality of wireless power transfer coils;
   energising a wireless power transfer coil dependent on a property of the induced current or voltage to make power available to the vehicle; and
   at least one of:
   energizing a coil of the vehicle to induce free resonant currents in the de-energized wireless power transfer coil to indicate to the de-energized wireless power transfer coil information about a primary current desired by the vehicle; or
   energizing the coil of the vehicle to induce free resonant currents in the de-energized wireless power transfer coil to indicate that the vehicle is approaching the de-energized wireless power transfer coil.

2. The method as claimed in claim 1 wherein the method comprises detecting a change in the current or voltage induced in the de-energised wireless power transfer coil when the vehicle is situated between the de-energised wireless power transfer coil and an energized coil from the plurality of wireless power transfer coils that is inducing the current or voltage in the de-energized coil, wherein the energized coil of the plurality of wireless power transfer coils is a neighboring wireless power transfer coil to the de-energized wireless power transfer coil along the path or roadway.

3. The method as claimed in claim 1 wherein the method comprises detecting a change in coupling, between the de-energised wireless power transfer coil and a neighboring wireless power transfer coil of the plurality of wireless power transfer coils, from the current or voltage induced in the de-energised wireless power transfer coil caused by the vehicle providing a magnetic path from the neighbouring energised wireless power transfer coil to the deenergised wireless power transfer coil.

4. The method as claimed in claim 1 comprising operating a converter of the de-energised wireless power transfer coil to make the de-energised wireless power transfer coil resonant at an operating frequency of the plurality of wireless power transfer coils such that the induced current or voltage is resonant.

5. The method of claim 1, wherein the method further comprises detecting, from the current or voltage induced in the de-energized wireless power transfer coil through mutual inductance with the energized wireless power transfer coil, the motion of the vehicle along the path or roadway, and transferring power wirelessly to the vehicle as it passes over a wireless power transfer coil to a coil of the vehicle.

6. The method as claimed in claim 1 further comprising energizing the coil of the vehicle to induce free resonant currents in the de-energized wireless power transfer coil to indicate that the vehicle is approaching the de-energized wireless power transfer coil.

7. The method as claimed in claim 1 further comprising energizing the coil of the vehicle to induce free resonant currents in the de-energized wireless power transfer coil to indicate to the de-energized wireless power transfer coil information about the primary current desired by the vehicle.

8. The method as claimed in claim 1 wherein detecting the current or voltage inducted in the de-energized wireless power transfer coil is executed using a current transformer.

9. A vehicle detection apparatus for detecting a vehicle on a path or roadway comprising a plurality of wireless charging modules, the apparatus comprising a detection circuit operable to detect a change in coupling between a second wireless charging module and a first wireless charging module due to the presence of the vehicle, wherein the apparatus is configured to detect, from the change in coupling between the second wireless charging module and the first wireless charging module due to the presence of the vehicle, the motion of the vehicle along the path or roadway, and to transfer power wirelessly to the vehicle via a coil of the vehicle as the coil of the vehicle passes over a wireless charging module based on the detected motion of the vehicle.

10. The wireless power transfer apparatus as claimed in claim 9, wherein the wireless power transfer apparatus comprises:
   a switch associated with each of the plurality of wireless charging modules to selectively energise the wireless charging modules to make power available to the vehicle, or selectively de-energise the wireless charging modules;
   a current detector associated with the detector circuit for detecting a current induced in the second wireless charging module when the second wireless charging module is de-energised; and
   a controller to control the switch of the second wireless charging module to energise the second wireless charging module dependent on an output of the detector circuit.

11. The wireless power transfer apparatus as claimed in claim 10 wherein the controller is operable to make the second wireless charging module resonant at an operating frequency of the first wireless charging module, when the second wireless charging module is de-energized, such that the induced current is resonant.

12. The wireless power transfer apparatus as claimed in claim 10 wherein the controller is configured to energize the second wireless charging module dependent on the magnitude of the induced current detected in the second wireless charging module.

13. The vehicle detection apparatus as claimed in claim 9 wherein the detection circuit is configured to make a de-energised module resonant at a required frequency such that the induced current or voltage is resonant.

14. The vehicle detection apparatus as claimed in claim 9 wherein the detection circuit is configured to detect the change in coupling, between the second wireless charging module and the first wireless charging module, by placing the second wireless charging module in a first state and sensing a current or a voltage induced in the second wireless charging module by the first wireless charging module, and the wireless power transfer apparatus is configured to concurrently place a third wireless charging module of the plurality of wireless charging modules in a second state while the detection circuit is sensing the current or the voltage induced in the second wireless charging module, wherein first state comprises a de-energized state in which the second wireless charging module is substantially resonant at an operating frequency of the first wireless charging module, and the second state comprises a de-energized state in which the third wireless charging module is not resonant at the operating frequency of the first wireless charging module.

15. The vehicle detection apparatus of claim 9, wherein the vehicle detection apparatus is configured to detect the change in coupling between the second wireless charging module and the first wireless charging module, caused by the presence of the vehicle, by sensing changes in free resonant current developed in at least one of the second wireless charging module and the first wireless charging module when the vehicle is located, with respect to the path or roadway that the vehicle is travelling along, between the second wireless charging module and the first wireless charging module.

16. The vehicle detection apparatus of claim 9, wherein the vehicle detection apparatus is configured, with respect to the plurality of wireless charging modules, with the first wireless charging module and the second wireless charging module disposed consecutively along the path or roadway.

17. The vehicle detection apparatus of claim 9, wherein the vehicle detection apparatus is configured to periodically short circuit the second wireless charging module, and sample the current induced in the second wireless charging module while the second wireless charging module is short circuited.

18. The vehicle detection apparatus of claim 9, wherein the vehicle detection apparatus includes separate sensors to detect the presence of the vehicle unrelated to the wireless charging modules.

19. The vehicle detection apparatus of claim 9, wherein the vehicle detection apparatus if for detecting a vehicle on the roadway, and wherein the detection circuit is a means for detecting the change in coupling between the second wireless charging module and the first wireless charging module due to the presence of the vehicle.

20. A method comprising detecting a change in coupling between at least two coils of a wireless charging apparatus, caused by an object situated between the at least two coils, by measuring a free resonant current induced in a first coil of the at least two coils by a second coil of the at least two coils, detecting a change in the free resonant current caused by the object situated between the at least two coils, and at least one of:
   energizing a coil of the object to induce free resonant currents in the first coil to indicate that the object is approaching the first coil; or
   switching a first converter of the wireless charging apparatus to cause the second coil of the at least two coils to make energy available for inductive power transfer at a first frequency, and switching a second converter of the wireless charging apparatus to cause the first coil of the at least two coils to be resonant at the first frequency while not making power available for inductive power transfer, wherein the method further comprises drawing, by the object situated between the at least two coils, at least 10 kW when the object is inductively coupled to at least one of the two coils.

21. The method of claim 20, wherein the method comprises placing the first coil of the at least two coils in a de-energized state, and making the first coil of the at least two coils resonant, at an operating frequency of the second coil of the at least two coils, while the first coil of the at least two coils is in the de-energized state.

22. The method of claim 20, wherein the method comprises switching the first converter of the wireless charging apparatus to cause the second coil of the at least two coils to make energy available for inductive power transfer at the first frequency, and switching the second converter of the wireless charging apparatus to cause the first coil of the at least two coils to be resonant at the first frequency while not making power available for inductive power transfer, wherein the method further comprises drawing, by the object situated between the at least two coils, at least 10 kW when the object is inductively coupled to at least one of the two coils.

23. The method of claim 22, wherein the method comprises causing the second converter to periodically short circuit the first coil of the at least two coils for a fraction of a resonant cycle at the first frequency, and wherein the method further comprises inductively charging the object.

24. The method of claim 20, wherein the method comprises detecting, from the change in coupling between at least two coils of the wireless charging apparatus, the motion of an electric vehicle along the wireless charging apparatus.

25. The method as claimed in claim 20 further comprising energizing the coil of the object to induce free resonant currents in the first coil to indicate that the object is approaching the first coil.

* * * * *